(12) United States Patent  
Salgado et al.

(10) Patent No.: US 8,037,110 B2  
(45) Date of Patent: Oct. 11, 2011

(54) BUSINESS DATA ACCESS CLIENT FOR ONLINE/OFFLINE CLIENT USE

(75) Inventors: Rolando Jimenez Salgado, Redmond, WA (US); Arshish Kapadia, Issaquah, WA (US); David Koronthaly, Sammamish, WA (US); Mohammed Nazeeruddin, Bellevue, WA (US); Sundar Paranthaman, Sammamish, WA (US); Kaushik Raj, Issaquah, WA (US); Tarkan Sevilmis, Redmond, WA (US); Targo Tennisberg, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 440 days.

(21) Appl. No.: 11/964,868

(22) Filed: Dec. 27, 2007

(65) Prior Publication Data

US 2009/0171679 A1    Jul. 2, 2009

(51) Int. Cl.  
*G06F 17/00* (2006.01)

(52) U.S. Cl. ........ 707/804; 707/688; 707/791; 707/793; 707/795; 707/802

(58) Field of Classification Search .................. 707/200, 707/688, 791, 793, 795, 802, 804  
See application file for complete search history.

(56) References Cited

U.S. PATENT DOCUMENTS

| | | | |
|---|---|---|---|
| 7,143,419 B2 | 11/2006 | Fischer et al. | |
| 7,239,877 B2 | 7/2007 | Corneille et al. | |
| 2004/0064570 A1 | 4/2004 | Tock | |
| 2004/0103202 A1 | 5/2004 | Hildebrand et al. | |
| 2005/0256896 A1 | 11/2005 | Pfeifer et al. | |
| 2006/0026166 A1 | 2/2006 | Sattler et al. | |
| 2007/0067354 A1 | 3/2007 | Mullender et al. | |
| 2007/0136390 A1 | 6/2007 | Blum et al. | |
| 2007/0219976 A1 | 9/2007 | Muralidhar et al. | |
| 2007/0226203 A1 | 9/2007 | Adya et al. | |
| 2007/0266051 A1* | 11/2007 | Moore | 707/200 |

OTHER PUBLICATIONS

"MOSS 2007 Collaboration", 1996-2007, FrontPages Web Hosting Network.  
Gruszczynski, et al., "Offline Business Objects: Enabling data persistence for distributed desktop applications", vol. 3761, 2005.

* cited by examiner

*Primary Examiner* — Sana Al Hashemi (57) ABSTRACT

Architecture for uninterrupted access to business data by enabling work on rich client machines to be stored in a local business data cache that is always available. A dispatching mechanism executes read/write requests against the local cache transparently to a client application, an automatic synchronization mechanism propagates changes bi-directionally when the client goes online and a live connection with the corresponding backend data source is available. A declarative data access model is employed based on operation stereotyping and grouping that enables client applications to transparently execute create, read, update, delete, query (CRUDQ) and association operations against the local cache as if executed against the actual business data source. The architecture supports the offline creation of entities and sets of related entities when the entity identifiers are generated by the business data source and offline navigation of entity associations when foreign keys are not present in the related entities.

18 Claims, 11 Drawing Sheets

BUSINESS DATA ACCESS CLIENT FOR ONLINE/OFFLINE CLIENT USE

BACKGROUND

Although becoming pervasive, connectivity still comes as a spectrum that ranges from being completely disconnected to having a high-speed always-on network connection. Slow or intermittent network connections can affect the ability of client-server applications to continue to respond promptly and consistently to user actions, thereby affecting productivity, and in the more egregious case, the corporate bottom line. Even in smaller network environments such as LANs, having to access data over the network in realtime for every operation can affect the performance and responsiveness of the application. In any case, connectivity can be unpredictable as connectivity can be available at one moment and not at the next (e.g., user undocking a laptop, moving out of range of a wireless network, unexpected network or services failures, etc.). The lack of connectivity to systems of record should not prevent data and services access from clients (e.g., thick, thin) and other processing entities.

In the realm of business applications, business data systems enable applications to programmatically access a wide range of business data sources (e.g., databases, web services, line-of-business systems, etc.). Information workers rely on business data applications to access and author backend-sourced business data from thin clients. However, reliable access to business data from rich clients is a big challenge because typical client-server applications require that a live connection must exist between the client application and the business data source. Live connections are not always present especially when users are mobile, away from the office or when the business data sources are intermittently available. However, business applications on the rich client need to manipulate business data seamlessly and efficiently even when server connectivity is slow, intermittent, or not available. More generally, reliable and up-to-date data interaction is important between clients and data sources (e.g., databases, web services, business systems, etc.) for both the user and companies.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture facilitates uninterrupted access to data (e.g., business, entertainment) by enabling work (or information) on client machines to be stored in a way (e.g., local data cache) that makes the data always available. For example, entertainment or social applications created according to the disclosed architecture can provide the benefits for the end-user.

The architecture finds particular application to business systems and rich clients. When embodied to utilize a cache subsystem, the architecture includes a dispatching mechanism that executes read/write requests against the cache transparently from the client application, and an automatic synchronization mechanism that propagates changes bi-directionally as soon as a live connection with the corresponding backend data source is available.

A declarative data access model is employed based on operation stereotyping and grouping that enables client applications to transparently execute create, read, update, delete, query (CRUDQ), associate and disassociate operations against the local cache as if executed against the actual business data source. The architecture includes a mechanism for supporting the offline creation of entities and sets of related entities even when the authoritative entity identifiers are generated by the business data source. A mechanism is also provided that supports offline navigation, creation, and deletion of entity associations when foreign keys are not present in the related entities.

A queue-based synchronization mechanism is employed for propagating cache changes into the business data source without requiring mid-tier or server components. The declarative model facilitates the automatic propagation of changes from any business data source to the client cache. An optional "remoting" mechanism allows client operations to work against otherwise unavailable business data sources, such as business data sources behind firewalls or other software protected barriers.

In another embodiment, a cache is not employed, yet provides generic access to any type of data source (e.g., business) based on a declarative entity model.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and equivalents. Other advantages and novel features will become apparent from the following detailed description when considered in conjunction with the drawings.

DETAILED DESCRIPTION

The disclosed architecture facilitates uninterrupted access to business data by enabling work on rich client machines to be stored in a local business data cache that provides high availability of the data. The basic components include a client and/or mid-tier-based runtime component that provides a programmatic object model which enables read/write access to business data based on a declarative entity model. A dispatcher component enables calls to be routed through the cache or directly against the backend business data source based on declarative and programmatic configurations. The dispatcher component also translates application create/read/update/delete (CRUD) requests into cache requests, as needed. However, if the cache is not present (e.g., when using a declarative entity model for generic access to a data source), the dispatcher component can process the requests into shim requests that in turn are executed against the backend system. Pluggable backend connectivity components (or shims) provide actual communication with the backend business systems. A cache manager component of the client provides data access and cache management APIs, and manages a queue in the local cache of pending changes and the state of the cached entities.

The local business data cache provides storage and low-level data access to business data, metadata and configuration data. A client synchronization component provides background synchronization of local changes including conflict detection, error tracking and automatic retry. A client-based cache refresh and cleanup component periodically propagates backend changes into the local cache and flushes unneeded data from the local cache. The cache refresh and cleanup component also includes conflict detection, error tracking and automatic retry. The cache also lets users create data that is not yet committed to the backend system (e.g., "drafts"). Thus, the cache acts as a staging area while users are working on these drafts. The draft can then be submitted to the backend at a later time.

A pair of remoter proxy/remoter stub components provides mid-tier based access to backend data sources, and enables clients to access data sources that otherwise would be unavailable (e.g., behind a firewall).

Cache refresh components can also use known synchronization patterns such as the use of version fields, bulk reads and updates, and anchor-based change enumeration, among others, to achieve an optimized propagation of changes (e.g., in terms of minimizing the amount of data transferred and number of requests made between client and server) between the backend source and the client cache. Additionally, cache refresh can also employ closure rules, which is a capability of "understanding" entity association to populate the cache with related entity instances.

Although described in the context of business applications, the scope is not limited to such, but also applies more generally to environments where access to any data source from a client machine is desired.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Figure 1:
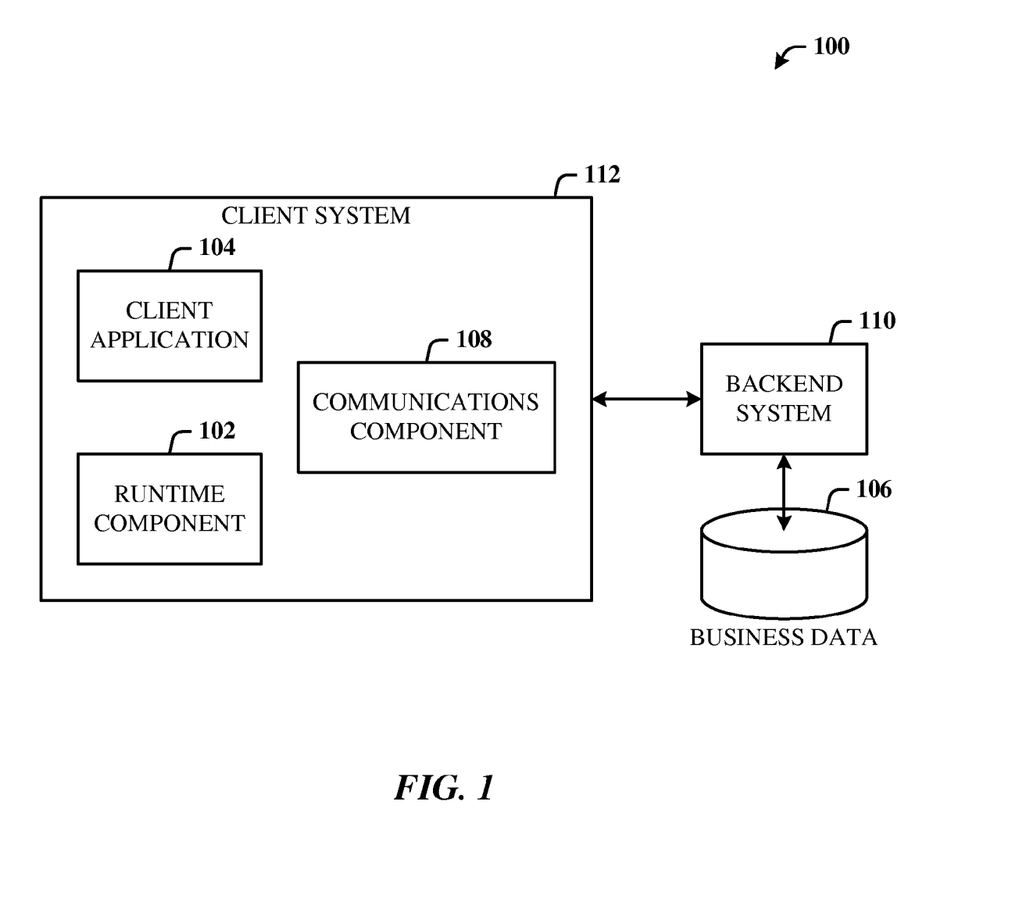
FIG. 1 illustrates a computer-implemented business system for online/offline data access in accordance with the disclosed architecture.

FIG. 1 illustrates a computer-implemented business system 100 for online/offline data access in accordance with the disclosed architecture. The system 100 includes a runtime component 102 for enabling access by a client application 104 to business data 106 based on a declarative data access model. The runtime provides a programmatic object model which enables read/write access to the business data 106 based on a declarative entity model. The system 100 also includes a communications component 108 for communicating access operations to the business data 106, which is stored on a backend system 110. The runtime component 102, client application 104 and communications component 108 can be part of a client system 112 (e.g., rich client such as a desktop computer)

Figure 2:
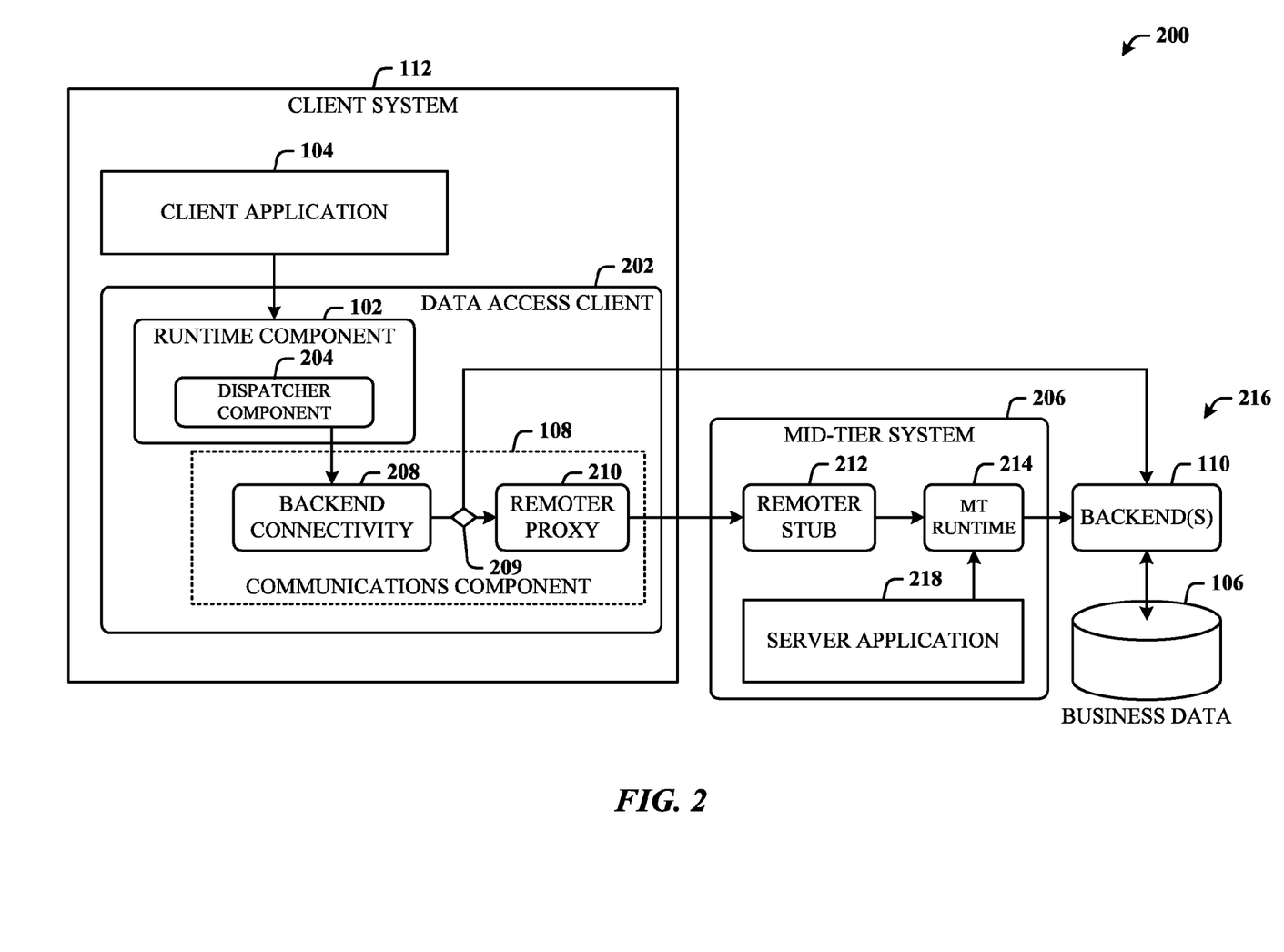
FIG. 2 illustrates a more detailed and exemplary system for access to business data via the client system.

FIG. 2 illustrates a more detailed and exemplary system 200 for access to business data via the client system 112. Here, the runtime component 102 and the communications component 108 are bundled as part of a data access client 202, which facilitates transparent access to the business data 106 of the backend system 110 (e.g., one of many such systems). The runtime component 102 is depicted as including a dispatcher component 204 that enables calls to be routed directly to the backend system 110 (and business data 106) based on declarative and programmatic configurations.

The communications component 108 includes components for connecting read/write access of the runtime component 102 directly to the backend system 110 (and business data 106) and/or indirectly through a mid-tier system 206 to the backend system 110 (and business data 106). The communications component 108 includes a backend connectivity component 208 that facilitates direct data access communications with the backend system 100 and business data 106 via an efficiency point 209 (represented by a diamond) showing that the data access client 202 can connect directly to the backend data source 216 (e.g., backend system 110 and associated business data 106). The communications component 108 also includes a remoter proxy 210 that communicates with a compatible remoter stub 212 of the mid-tier system 206. The remoter stub 212 connects to a mid-tier (MT) runtime component 214 (similar in functionality to the client runtime component 102).

The mid-tier system 206 is illustrated as optionally including a server-based application 218 similar in functionality to the client application 104. In other words, the same API that is used on the client system 112 can be used on the mid-tier server system 206. The declarative model, shim extensibility, etc., can be utilized symmetrically on both the client system 112 and a server system (e.g., mid-tier system 206).

Figure 3:
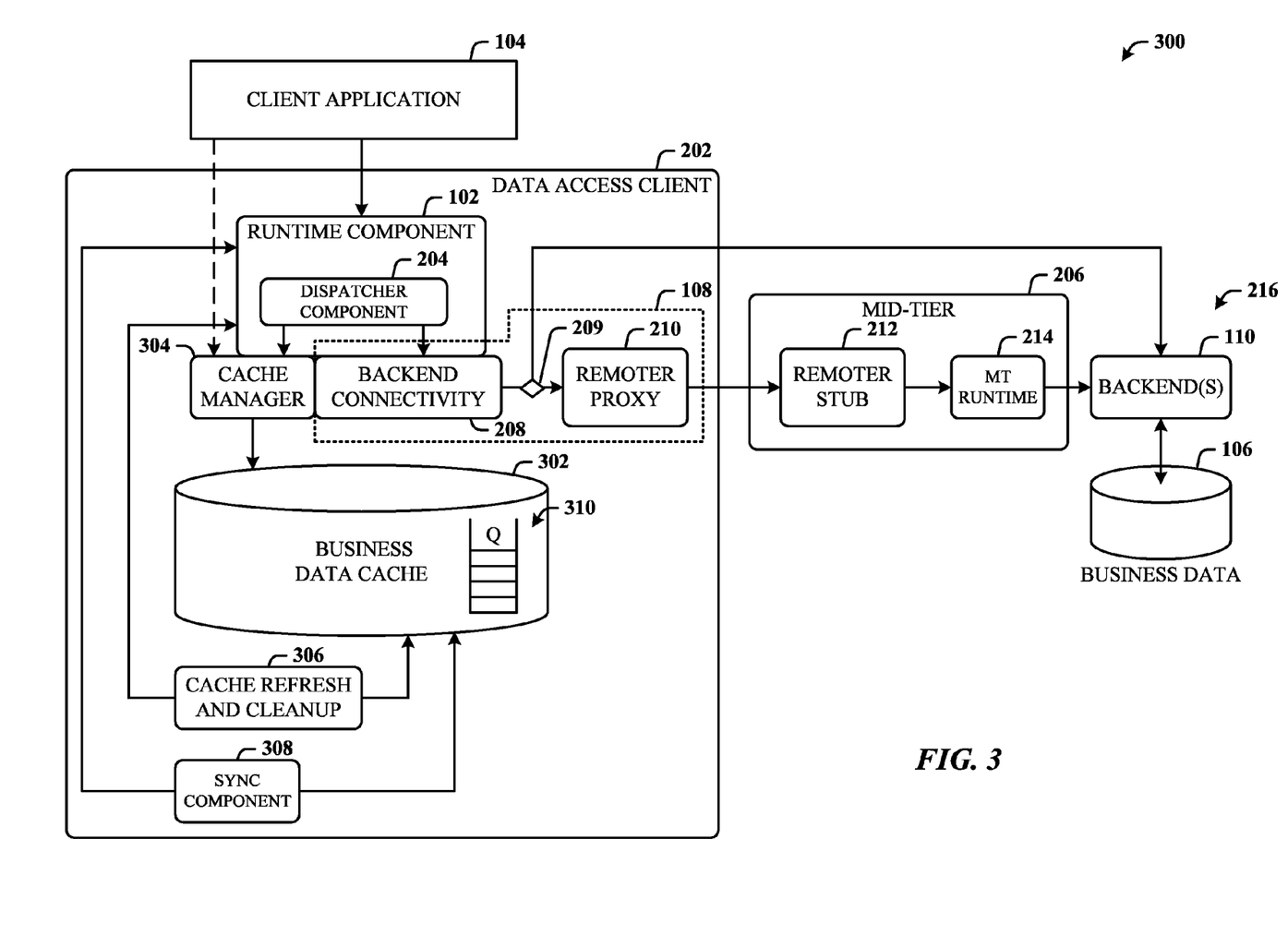
FIG. 3 illustrates an exemplary online/offline system for business data access.

FIG. 3 illustrates an exemplary online/offline system 300 for business data access. The system 300 adds a cache stack for offline processes to the system 200 of FIG. 2. The stack includes a business data cache 302, a cache manager 304, a cache refresh and cleanup component 306 and synchronization component 308 (e.g., agent). The data cache 302 also includes a queue 310, which will be described later.

The runtime component 102 provides a programmatic object model which enables read/write access to business data based on a declarative entity model. The dispatcher component 204 enables calls to be routed through the cache 302 or directly against the backend 110 based on declarative and programmatic configurations. The dispatcher component 204 translates application CRUD (create/read/update/delete) and association (associate/disassociate) requests into cache requests, as needed. The associate/disassociate operations allow for correlating different entity instances, typically of different types, but not necessarily.

The pluggable backend connectivity component 208 provides communications with the backend system 110. The cache manager 304 provides data access and cache management APIs, and manages the queue 310 of pending changes and the state of the cached entities. The business data cache (CACHE) provides storage and low-level data access to business data cached entities, entity metadata, configuration data and cache subscriptions, for example.

The synchronization component 308 provides background synchronization of local data changes (or differences) including conflict detection, error tracking and automatic retry. The cache refresh and cleanup component 306 periodically propagates backend changes (or differences) into the cache 302 and flushes unneeded data from the cache 302. The cache refresh and cleanup component 306 and the synchronization component 308 also connect back to the runtime component 102 such that data can be synchronized to the backend system 110 and business data 106. The remoter proxy 210 (of the communications component 108) interfaces to the remoter stub 212 of the mid-tier system 206 for mid-tier based access to the backend business data 106. The remoter proxy/stub pair (210 and 212) enables the client application 104 to access data sources (e.g., multiple disparate) that otherwise would be unavailable (e.g., firewall between client and backend).

The runtime component 102 on the client machine enables data access of read/write data access to the business data 106 coming from the backend data source 216. The runtime component 102 employs the declarative entity model that describes what the data looks like and surfaces this data in the form of data entities. The runtime component 102, now deployed as a novel aspect on the client system, takes the description and enables applications (e.g., client application 104) to read and write the business data in the form of the data entities, rather than read-only and server-only.

The client runtime component 102 exposes an object model that consuming applications can use to programmatically access the business data 106. As illustrated, there are at least two different ways in which the data access client 202 can get to the business data 106. In order to get to the business data 106, the dispatcher component 204 inside the runtime component 102 decides whether the data calls will be made against the cache 302 or the business data source 216.

The communications component 108 includes the backend connectivity component 208, one or more of which can be made pluggable. That is, third parties or end users, for example, can create pluggable backend connectivity components for specific purposes such that the runtime component 102 can use the pluggable component 208 to connect to different types of backend systems. Thus, the role of the backend connectivity component 208 is to understand a particular type of backend or backend connectivity. For example, one pluggable connectivity component knows how to talk to a web server, another knows how to talk to a database, yet another knows how to talk to a web collaboration server, and so on.

The cache manager 304 provides access to the local cache 302. The runtime component 102 interacts with this cache manager 304 in order to execute CRUD and execution of operations against the business data cache. The cache manager 304 arbitrates access to the local cache 302 in which data resides on the rich client.

As previously indicated, there are two ways in which the client application 104 can access the business data 106: through the runtime object model that exposes the data as entities and the cache manager 304 exposes a public object model that allows control of some aspects of the cache 302 programmatically. The cache manager 304 provides control over cache subscriptions, for example. The cache subscription is a rule that tells the cache refresh and cleanup component 306 what is to be brought into the cache 302. Subscriptions can be created declaratively, similar to the rest of the data model. Thus, via the object model exposed to client application 104, these rules can be controlled programmatically. Additionally, synchronization errors can be detected and resolved. This is represented by the dash arrow from the client application 104 directly to the cache manager 304 where client applications can talk to the cache manager 304 directly to control some aspects of the cache 302.

The data cache 302 is a database having a set of structures that allows storage of the actual business data for surfacing to the client application 104, as well as the configuration structures that allows storing the metadata catalog, for example, that provides the descriptions that specifies how the business data will be surfaced to the client application 104 for data such as cache subscriptions which basically specify how and how often the business data 106 will be read from the business data source 216 and refreshed into the cache 302.

This cache 302 also includes the synchronization queue 310 in which all operations executed locally by the client application 104 are tracked. Eventually that queue 310 will be read by the synchronization component 308 to be propagated into the backend data source 216. In other words, the synchronization component 308 and the cache refresh and cleanup component 306 take care of synchronizing the contents of the cache 302 with the backend data source 216. The synchronization component 308 is responsible for ridding the synchronization queue 310 of all the changes that are made by the client application 104 and tracked in the local machine. The synchronization component 308 reads from the queue 310 and executes against the backend data source 216. The synchronization component 308 includes logic to detect conflicts. In other words, whenever the data is changed both in the cache 302 and in the business data source 216 conflicts can be detected, tracked, and surfaced to the client application 104.

The cache refresh and cleanup component 306 propagates changes that were made natively in the backend data 106 into the cache 302 (a "cache refresh" function). The component 306 periodically pulls data from the backend business data 106 based on declarative rules called the cache subscriptions. The cache subscription is a rule that tells the cache refresh part of the component 306 what operations are to be executed against the backend data source 216, and how often the operations will be executed in order to bring fresh data into the cache 302.

Another function is the cleanup functionality. In order to keep the size of the cache 302 to an optimal level the component 306 is also purges some or all data (the component 306 can decide to purge a subset without affecting the functionality) that is no longer needed according to the cache subscriptions. Thus, another role of cache subscription is determining what data is relevant for the application 104. A cache subscription also defines one or more queries that determine the set of entities that a particular application 104 cares about. Whenever a query no longer returns a particular instance, this means the application 104 no longer needs the data and the cache refresh and cleanup component 306 operates to remove the data from the cache 302 to maintain the cache 302 at an optimal size.

As illustrated, the cache refresh and cleanup component 306 and the synchronization components 308 interface to the runtime component 102 by using the fact that the runtime component 102 is already capable of connecting to the backend data source 216. The pluggable backend connectivity components (e.g., component 208) provide an extensible means for accommodating changing requirements to external systems. To actually propagate the different operations that we are executing to the cache. So whenever the component 306 or synchronization component 308 execute an operation against the backend, they will again go through the runtime component 102 and instruct the runtime 102 to execute that particular operation against the corresponding backend source 216.

The cache refresh and cleanup component 306 provides automatic query-based cache refresh, automatic instance-based cache refresh, implicit caching and manual cache refresh. With respect to automatic query-based cache refresh, a user can specify a different query and a refresh rate for different queries. For example, a query for a first account can be refreshed every week, while a query for a second account can be refreshed every day. Moreover, these two account sets can have different overlaps at any point in time. When this happens, the system can be configured to perform a refresh according to the more frequent schedule of one day. When an account ceases to be part of any of the two queries, the account is automatically removed from the cache to free-up space.

With respect to automatic instance-based cache refresh, the user can specify a desire for receiving the latest updates as soon as possible and can be no older than a specified time (a refresh rate). The data is automatically synchronized in the background and kept as fresh as the user requires the data and whenever connectivity allows. The user can change the refresh rate at any point in time or just state that the data no longer needs to be cached, in which case the system frees up the corresponding space on disk.

With respect to implicit caching, the user may need to request information from the system that is not explicitly included in any instance-based or query-based caching rules. Since the information is not in the cache, the system obtains the information when online, and caches the information a while in case the user needs it again. Similarly, the component 306 will automatically clean up the cache 302 after a configurable period of time from the last time the information was used. If the user is not online and tries to read non-cached information, the read operation will fail. However, the system will treat this as a hint to automatically bring the requested information to the cache 302 as soon as connectivity is available. Alternatively, a delay can be employed to cache the information at a later time, as desired. This way, the information will be there if the user tries to read the information again when in an offline mode. The user can also perform a manual cache refresh of one or more queries.

The efficiency point 209 facilitates communicates directly to the backend source 216 or indirectly through the mid-tier system 206, and then to the backend data source 216. Thus, in the case of a web service, the web service call can be directly to the backend data source 216. However, the option exists to process the same call through the mid-tier system 206. In support thereof, the mid-tier system 206 hosts the remoting stub 212 that understands the call and is capable of routing the call from the mid-tier system 206 to the backend data source 216. This enables situations in which the client requires permission for access to the backend data source 216, for network configuration, or other reasons for which direct access is not directly provided to the backend data source 216. The remoter stub 212 talks to the mid-tier runtime component 214 (similar to the runtime component 102), which then facilitates access to the backend data source 216.

Following is a series of flow charts representative of exemplary methodologies for performing novel aspects of the disclosed architecture. While, for purposes of simplicity of explanation, one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
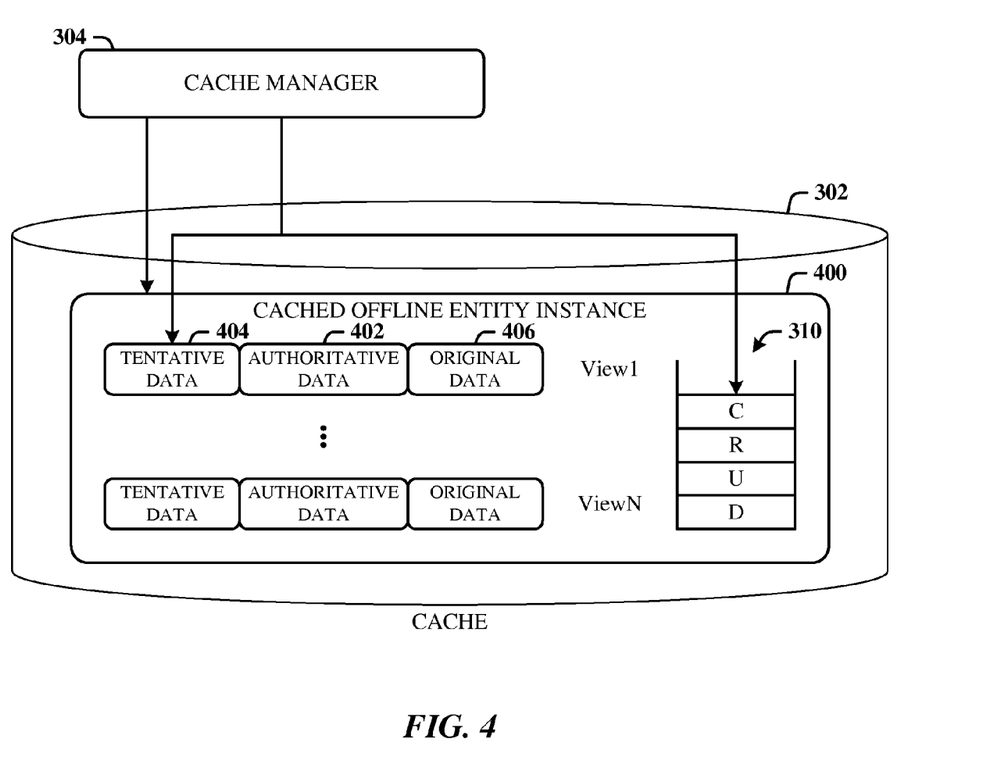
FIG. 4 illustrates details of a cached entity for offline business data caching.

FIG. 4 illustrates details of a cached entity for offline business data caching. The unit of consistency, storage and synchronization is the offline entity instance (OEI) 400. The OEI 400 represents a logical entry in the cache 302 containing the field values of a particular instance of a view. A view is a collection of fields returned by a method. For each OEI, the cache 302 tracks several states or cache rows. An OEI consists of one or more cache rows and a set of status properties. To exist in the cache 302, an OEI includes at least one cache row and in most cases the OEI will have more than one cache row. A cache row is a snapshot of the state of an OEI at a particular point time. The possible states that cache rows can represent are authoritative state data 402, tentative state data 404, committed or original state data 406.

The authoritative state (or data) 402 is the state of the OEI exactly as returned by the last read operation from the backend. When local changes have been made, authoritative state 402 provides a means to store fresh data without overriding the local changes. The authoritative state 402 is normally used to aid in conflict detection and resolution.

The tentative state 404 is the state of the OEI resulting from a local update operation. A particular OEI will have as many tentative states 404 as pending updates in the queue 310. However, in most cases, update operations can be rolled up resulting in a single pending update in the queue 310.

The original state 406 is a snapshot of the authoritative state 402 taken at the moment the first local update is made. Tracking the original state 406 separately is used for conflict detection because the authoritative state 402 can be updated by cache refresh after a local update is made. The committed state is a state of the OEI that was successfully propagated to the backend. The committed state is tracked mainly for troubleshooting purposes and can eventually be garbage collected.

Other states include previous state (state against which an operation was performed), resulting state (state that resulted from, or is expected to be the result of, executing an operation), current state (reflects the most current data considering local changes) and baseline state (the state upon which all currently pending changes were made).

A cache row is named based on the state represented, for example, the authoritative row is the row that represents the authoritative state of the OEI. At any point in time an OEI can have, 0 or 1 authoritative rows, 0 or more tentative rows, 0 or more committed rows, and 0 or more original rows.

A single entity (in the object model) can have multiple views. For each entity ID there can be multiple OEIs in the cache. Multiple views on the same entity could share the same field, and such views are called overlapping views For the sake of simplification, it is acceptable to treat multiple views as isolated units from the synchronization and caching perspective. This means it is acceptable for the same (logical) field to have different values in two or more overlapping OEIs. By default, all CRUDQ entity operations can be made against the cache 302, but as previously indicated, the entity operations can be executed directly against the backend if explicitly requested (online support).

CRUD operations against the cache 302 can be synchronous. The cache 302 is populated and automatically refreshed/purged by the automatic cache refresh and cleanup component 306, and synchronization status, errors and conflicts are reported/updated asynchronously by the synchronization component 308. Cache-based operation components can, but do not need to, run in a different process than that of the automatic cache refresh/cleanup component 306 and the synchronization component 308. Multiple business applications can share the same OEIs, multiple users can share the same client machine, and a single user can have multiple client machines.

The cache manager 304 performs CRUDQ operations on the tentative data 404, CRUD operations on the queue 310, and has general access to the cached entity instance for a system query, access to the authoritative state data 402, original data 406, and access to cache-specific properties and methods.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
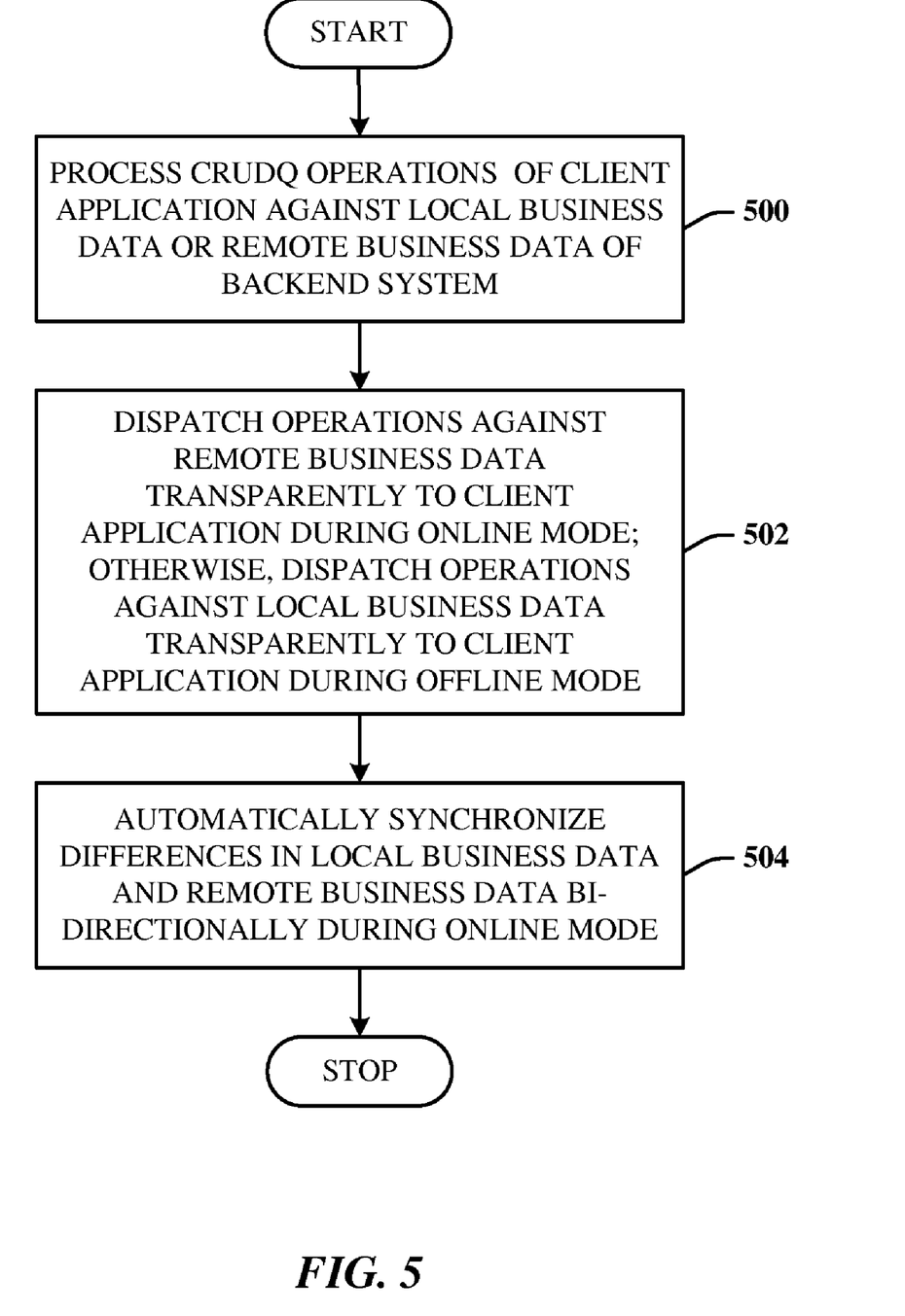
FIG. 5 illustrates a computer-implemented method of processing data.

FIG. 5 illustrates a computer-implemented method of processing data. At 500, CRUD and query operations of a client application are processed against local business data, or remote business data of a backend system. At 502, the operations are dispatched against the remote business data of the backend system, transparently to the client application, during an online mode. Otherwise, the operations are dispatched against the local business data, transparently to the client application, during an offline mode. At 504, differences in the local business data and the remote business data are automatically synchronized bi-directionally during the online mode.

Figure 6:
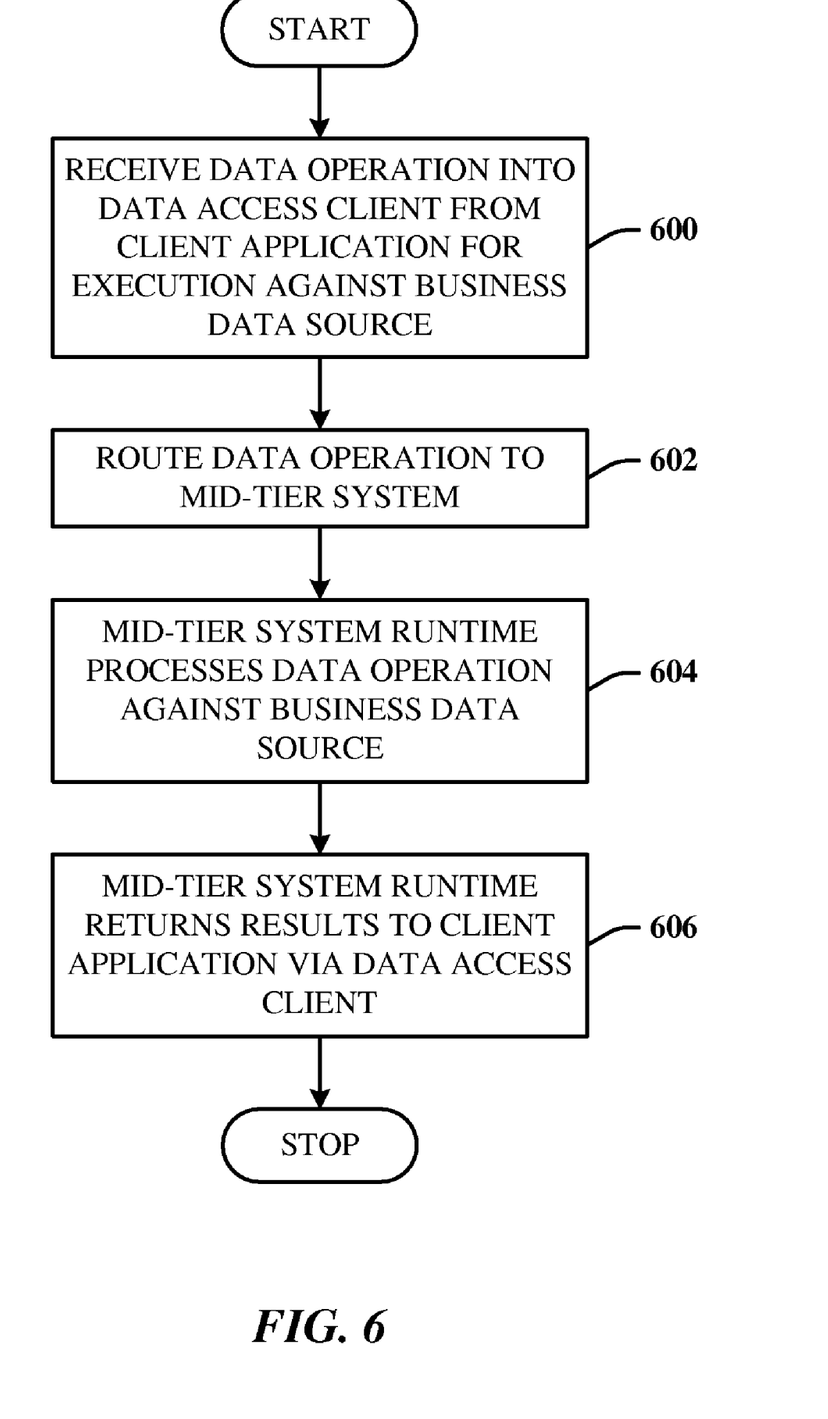
FIG. 6 illustrates a method of utilizing a mid-tier system for data access to a backend business data source.

FIG. 6 illustrates a method of utilizing a mid-tier system for data access to a backend business data source. At 600, a request for a data operation is received into a data access client from a client application for execution against a business data source. At 602, the data operation is routed by the data access client to a mid-tier system. At 604, a mid-tier system runtime processes the data operation against the business data source. At 606, the mid-tier runtime returns results of the data operation to the client application via the data access client. It is within contemplation, however, that the results could be returned to the data access client via a path other than the mid-tier system (e.g., directly).

Figure 7:
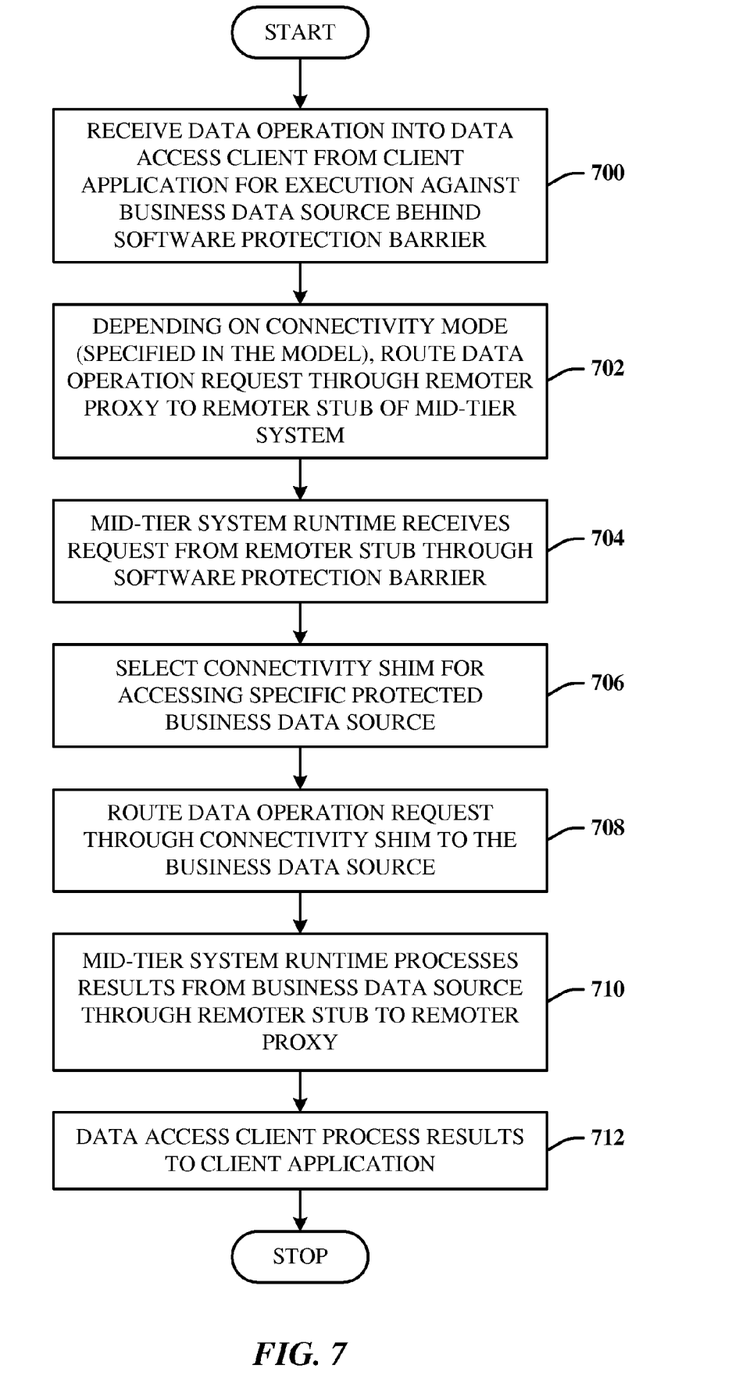
FIG. 7 illustrates a method of accessing business data behind a software protection barrier.

FIG. 7 illustrates a method of accessing business data behind a software protection barrier. At 700, a data operation request is received into the data access client from the client application for execution. The declarative data model can specify whether the operation should be executed directly against the data source, or routed through the mid-tier system (e.g., in case the business data source is behind a software protection barrier). If the request should be routed through mid-tier then, at 702, the operation is sent to through the remoter proxy to the remoter stub on the mid-tier. At 704, the mid-tier system receives the request from the client system. At 706, a connectivity shim is selected for accessing the specific protected business data source. At 708, the data operation request is routed though the connectivity shim to the business data source. At 710, the mid-tier system runtime processes results to the request from the business data source through the remoter stub to the remoter proxy. At 712, the data access client processes the results to the client application.

Figure 8:
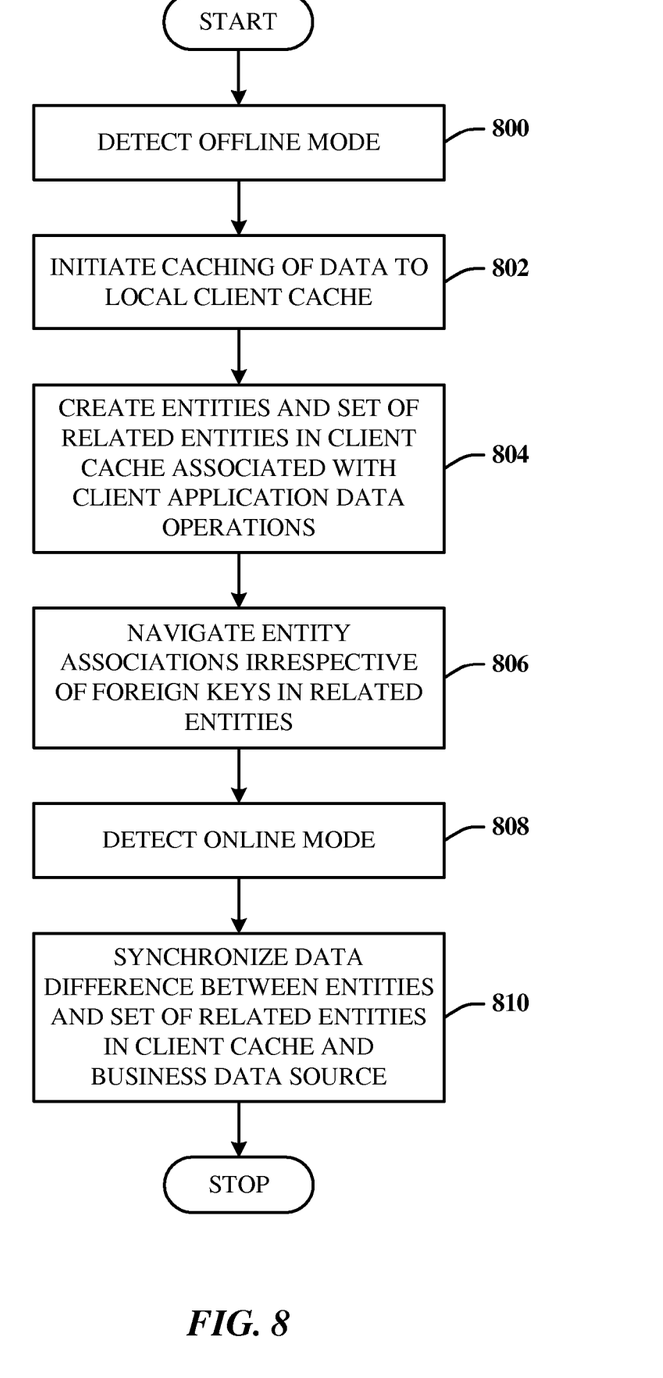
FIG. 8 illustrates operation of associations when the client is offline.

FIG. 8 illustrates operation of associations when the client is offline. At 800, the client system detects offline mode. At 802, the data access client of the client system automatically initiates local caching of business data. At 804, the data access client creates data entities and a set of related entities in the client cache associated with the client application data operations. At 806, the user can navigate entity associations irrespective of foreign keys being available in the related entities. At 808, the client system detects an online mode. At 810, data differences synchronization occurs between entities and set of related entities in the client cache and the business data source.

Figure 9:
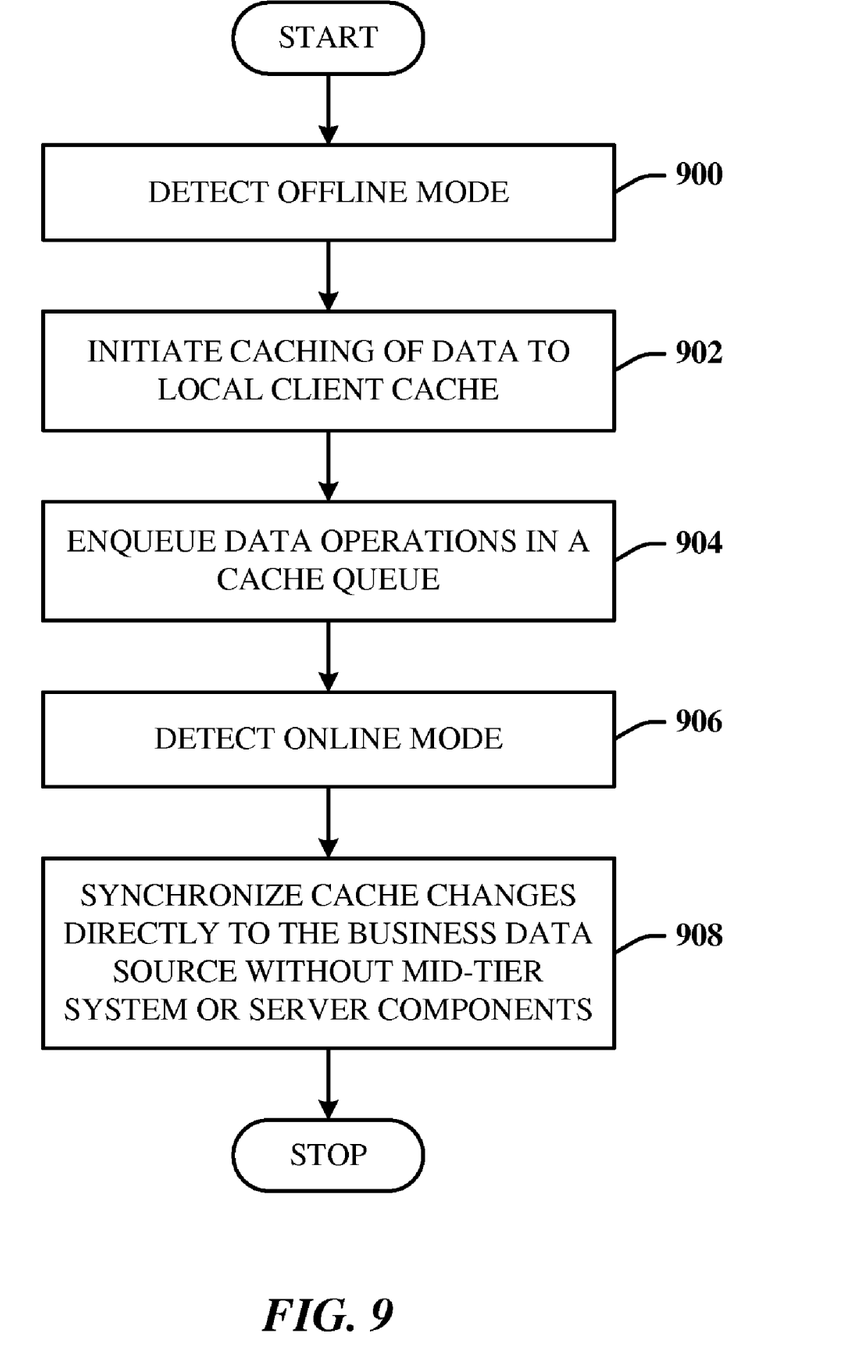
FIG. 9 illustrates tracking and executing operations when the client is offline.

FIG. 9 illustrates a method of tracking and executing operations when the client of offline. At 900, the client system detects offline mode. At 902, the client runtime initiates offline caching of data in the local client cache. At 904, data operations are enqueued in a cache enqueue. At 906, the client system detects online mode. At 908, synchronization of the data cache occurs directly to the business data source without a mid-tier system or server components.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 10:
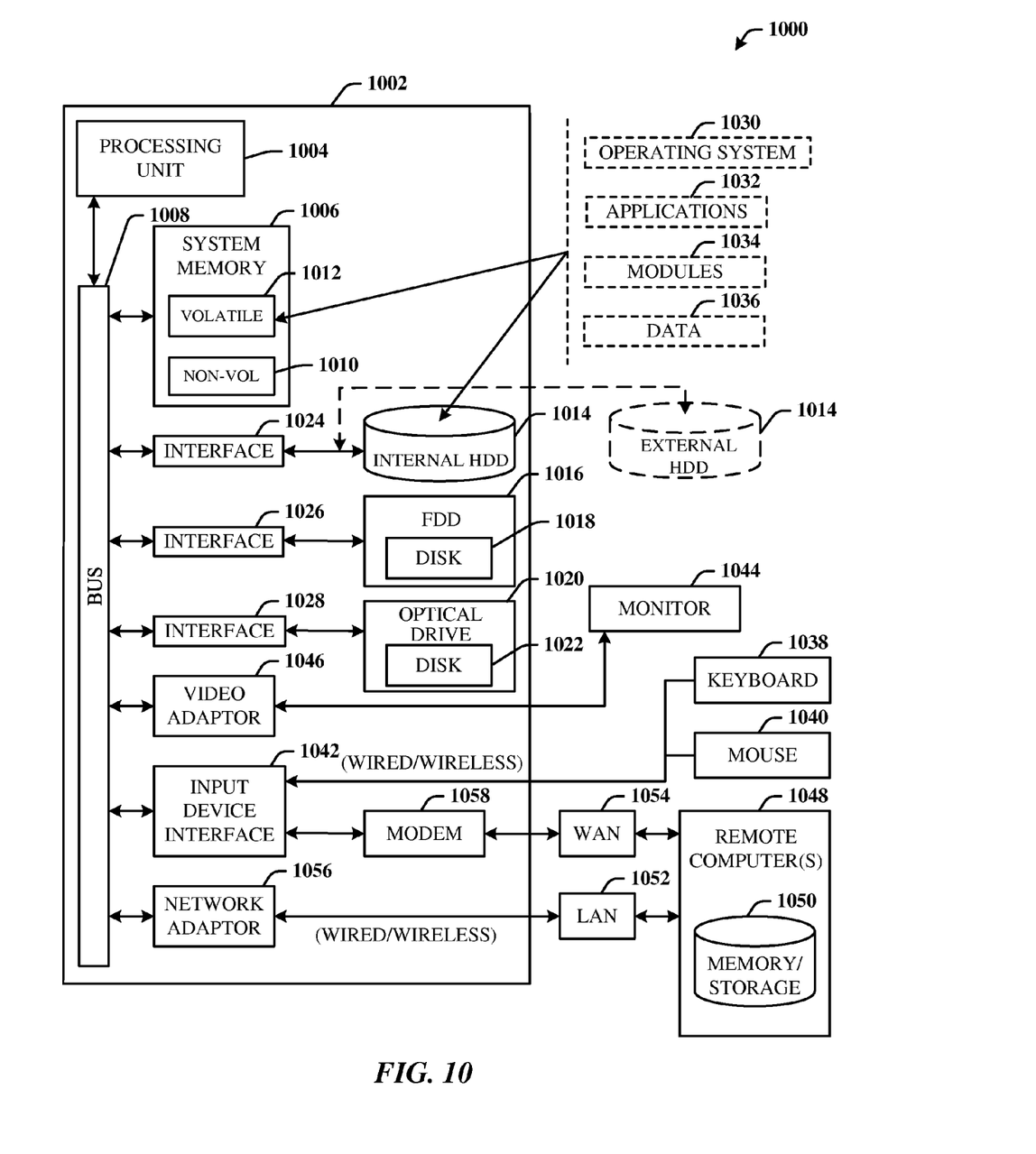
FIG. 10 illustrates a block diagram of a computing system operable to execute online/offline business data synchronization between a rich client and a business data source in accordance with the disclosed architecture.

Referring now to FIG. 10, there is illustrated a block diagram of a computing system 1000 operable to execute online/offline business data synchronization between a rich client and a business data source in accordance with the disclosed architecture. In order to provide additional context for various aspects thereof, FIG. 10 and the following discussion are intended to provide a brief, general description of a suitable computing system 1000 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 10, the exemplary computing system 1000 for implementing various aspects includes a computer 1002 having a processing unit 1004, a system memory 1006 and a system bus 1008. The system bus 1008 provides an interface for system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 can include non-volatile memory (NON-VOL) 1010 and/or volatile memory 1012 (e.g., random access memory (RAM)). A basic input/output system (BIOS) can be stored in the non-volatile memory 1010 (e.g., ROM, EPROM, EEPROM, etc.), which BIOS stores the basic routines that help to transfer information between elements within the computer 1002, such as during start-up. The volatile memory 1012 can also include a high-speed RAM such as static RAM for caching data.

The computer 1002 further includes an internal hard disk drive (HDD) 1014 (e.g., EIDE, SATA), which internal HDD 1014 may also be configured for external use in a suitable chassis, a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as a DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 1012, including an operating system 1030, one or more application programs 1032, other program modules 1034, and program data 1036. The one or more application programs 1032, other program modules 1034, and program data 1036 can include the runtime component 102, client application 104, communications component 108, data access client 202, dispatcher component 204, backend connectivity component 208, remoter proxy 210, business data cache 302, cache manager 304, cache refresh and cleanup component 306, synchronization component 308, cache queue 310, OEI 400, authoritative state data 402, tentative state data 404 and original state data 406, for example. The computer 1002 can be the client system 112.

All or portions of the operating system, applications, modules, and/or data can also be cached in the volatile memory 1012. It is to be appreciated that the disclosed architecture can be implemented with various commercially available operating systems or combinations of operating systems.

A user can enter commands and information into the computer 1002 through one or more wire/wireless input devices, for example, a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, etc.

A monitor 1044 or other type of display device is also connected to the system bus 1008 via an interface, such as a video adaptor 1046. In addition to the monitor 1044, a computer typically includes other peripheral output devices (not shown), such as speakers, printers, etc.

The computer 1002 may operate in a networked environment using logical connections via wire and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, is connected to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

It is to be appreciated that a more slimmed-down computing system or device can be utilized to obtain the benefits described herein. For example, it is not a requirement that the computing system or device have the FDD, optical drives, monitor, video capabilities, keyboard, mouse, etc., such as are the capabilities of many handheld devices. Moreover, the storage system for storing the information does not need to include HDD or other mass storage subsystem, but can be chip-based such as flash memory in the form of removable cards, or onboard flash memory subsystems, etc.

Figure 11:
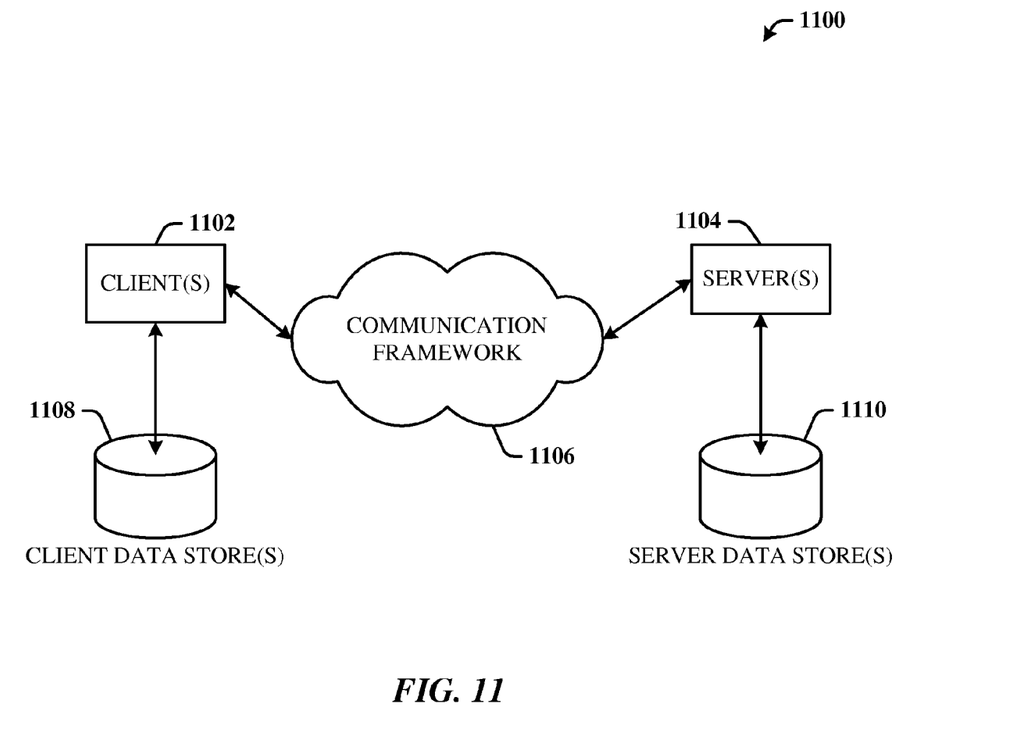
FIG. 11 illustrates a schematic block diagram of an exemplary computing environment that performs offline/online business data synchronization for a rich client.

Referring now to FIG. 11, there is illustrated a schematic block diagram of an exemplary computing environment 1100 that performs offline/online business data synchronization for a rich client. The environment 1100 includes one or more client(s) 1102. The client(s) 1102 can be hardware and/or software (e.g., threads, processes, computing devices). The client(s) 1102 can house cookie(s) and/or associated contextual information, for example.

The environment 1100 also includes one or more server(s) 1104. The server(s) 1104 can also be hardware and/or software (e.g., threads, processes, computing devices). The servers 1104 can house threads to perform transformations by employing the architecture, for example. One possible communication between a client 1102 and a server 1104 can be in the form of a data packet adapted to be transmitted between two or more computer processes. The data packet may include a cookie and/or associated contextual information, for example. The environment 1100 includes a communication framework 1106 (e.g., a global communication network such as the Internet) that can be employed to facilitate communications between the client(s) 1102 and the server(s) 1104.

Communications can be facilitated via a wire (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104. The server datastores 1110 can include the business data 106.

The clients 1102 can include the client system 112, and the servers 1104 can include the mid-tier system 206 and backend business data source 216.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented business system, comprising:
    a client system for accessing business data in selectively one of an online mode or an offline mode;
    a backend system for storing the business data;
    a runtime component of the client system for enabling read/write access by a client application of the client system to the business data based on a declarative data access model;
    a communications component of the client system for communicating access operations to the business data, stored on the backend system, in the online mode;
    a cache component of the client system for storing at least a portion of the business data during an offline mode, to enable uninterrupted access to the business data on the client system; and
    a processor operable to execute computer-executable instructions associated with at least one of the client system, the backend system, the runtime component, the communications component, or the cache component.

2. A computer-implemented method, comprising acts of:
    accessing business data in selectively one of an online mode or an offline mode;
    storing the business data on a backend system;
    enabling read/write access by a client application to the business data based on a declarative data access model; and
    communicating access operations to the business data stored on the backend system, in the online mode;
    storing at least a portion of the business data during an offline mode, to enable uninterrupted access to the business data; and
    utilizing a processor to execute instructions stored in memory to perform at least one of the acts of accessing, storing, enabling, communicating, or storing.

3. The system of claim 1 wherein the runtime component accesses the business data of the backend system via a mid-tier system.

4. The system of claim 1, wherein the runtime component includes a dispatcher component for executing data requests of the client application against the business data.

5. The system of claim 1, wherein the cache component further comprises a synchronization component for synchronization to the backend system during an online mode.

6. The system of claim 1, wherein the communications component includes a remoting system that allows client application CRUD and query operations to be applied against business data sources with restricted access.

7. The method of claim 2, further comprising accessing the business data of the backend system via a mid-tier system.

8. The method of claim 2, further comprising executing data requests of the client application against the business data.

9. The method of claim 2, further comprising enabling client application CRUD and query operations to be applied against business data sources with restricted access.

10. The system of claim 5, wherein the synchronization component further comprises an automatic synchronization component for automatically bi-directionally synchronizing the portions of the business data to the backend system and changes in the business data of the backend system to the cache component.

11. The system of claim 5, further comprising a cache manager for managing a queue of pending changes and state of cached entities in the cache component.

12. The system of claim 5, wherein the declarative data access model enables the client to execute create, read, update, delete (CRUD) query and association operations against the portions of the business data of the cache component and the business data of the backend system.

13. The system of claim 5, further comprising a cache refresh and cleanup component for propagating changes in the business data from the backend system to the cache component and flushing unneeded business data from the cache component.

14. The method of claim 8, further comprising synchronizing to the backend system during an online mode.

15. The method of claim 14, further comprising automatically bi-directionally synchronizing the portions of the business data to the backend system.

16. The method of claim 14, further comprising managing a queue of pending changes and state of cached entities.

17. The method of claim 14, further comprising enabling the client application to execute create, read, update, delete (CRUD) query and association operations against at least the portions of the business data.

18. The method of claim 14, further comprising propagating changes in the business data from the backend system and flushing unneeded business data.

* * * * *